US008934356B2

(12) United States Patent
Casati et al.

(10) Patent No.: US 8,934,356 B2
(45) Date of Patent: Jan. 13, 2015

(54) EXPLICIT INDICATION OF BEARERS SUBJECT TO VOICE CALL CONTINUITY

(75) Inventors: Alessio Casati, West Molesey (GB); Nicolas Drevon, Paris (FR); Laurent Thiebaut, Antony (FR); Andrew Bennett, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 795 days.

(21) Appl. No.: 12/999,797

(22) PCT Filed: Jun. 10, 2009

(86) PCT No.: PCT/EP2009/004180
§ 371 (c)(1), (2), (4) Date: Mar. 14, 2011

(87) PCT Pub. No.: WO2010/003501
PCT Pub. Date: Jan. 14, 2010

(65) Prior Publication Data
US 2011/0158121 A1    Jun. 30, 2011

(30) Foreign Application Priority Data
Jun. 17, 2008   (EP) .................................... 08290567

(51) Int. Cl.
*H04L 1/00* (2006.01)
*H04W 36/00* (2009.01)
*H04W 36/28* (2009.01)
(Continued)

(52) U.S. Cl.
CPC ...... *H04W 36/0022* (2013.01); *H04W 36/0033* (2013.01); *H04W 36/28* (2013.01); *H04W 76/022* (2013.01); *H04W 76/041* (2013.01); *H04W 80/04* (2013.01)

USPC .......................................... 370/252; 370/331

(58) Field of Classification Search
USPC ........................... 370/331, 338; 455/436, 424
See application file for complete search history.

(56) References Cited

U.S. PATENT DOCUMENTS

2006/0114871 A1   6/2006   Bumiller
2007/0014281 A1*  1/2007   Kant ............................. 370/352

(Continued)

FOREIGN PATENT DOCUMENTS

| WO | 0131963 A1 | 5/2001 |
|---|---|---|
| WO | 2008002997 A2 | 1/2008 |
| WO | WO 2009089987 A1 * | 7/2009 |

OTHER PUBLICATIONS

3GPP: "Technical Specification Group Services and System Aspects; Single Radio Voice Call Continuity (SRVCC); Stage 2 (Release 8)", Jun. 9, 2008, XP002545302 Retrieved from the Internet; URL: http://www.3gpp.org/ftp/Specs/html-info/23216.htm [retrieved on Dec. 10, 2012] Submitted by applicant.*

(Continued)

*Primary Examiner* — Andrew Lai
*Assistant Examiner* — Jamaal Henson
(74) *Attorney, Agent, or Firm* — Fay Sharpe LLP

(57) ABSTRACT

A method, user equipment and a network entity are disclosed. The method comprises the steps of: determining which of a plurality of packet bearers carry voice media components for handover between a packet-switched network and a circuit-switched network to ensure voice call continuity; and notifying an entity that will said enforce voice call continuity for which of said plurality of packet bearers carry said voice media components.

22 Claims, 1 Drawing Sheet

(51) Int. Cl.
*H04W 76/02* (2009.01)
*H04W 76/04* (2009.01)
*H04W 80/04* (2009.01)

(56) References Cited

U.S. PATENT DOCUMENTS

2008/0102815 A1* 5/2008 Sengupta et al. ............. 455/424
2008/0293418 A1* 11/2008 Choksi et al. ................. 455/436
2009/0219843 A1* 9/2009 Chin et al. .................... 370/310

OTHER PUBLICATIONS

Amand SV; Tyagi R ED—Passerini K; Patten K P; Bartolacci M; "Unified Protocol Stack Architecture for 4G Mobile Terminals to Support Multiple Radio Access Technologies" Wireless Telecommunication Symposium, 2007, WTS 2007, IEEE, Piscataway NJ, USA, Apr. 26, 2007, 6 pages retrieved [Dec. 10, 2012] Submitted by applicant.*

3GPP: "Technical Specification Group Services and System Aspects; Single Radio Voice Call Continuity (SRVCC); Stage 2 (Release 8)", Jun. 9, 2008, XP002545302 Retrieved from the Internet; URL:httg://www.3gpQ.org/ftg/S-Recs/html-info/23216.htm [retrieved on Dec. 10, 2012].*

3GPP: "Technical Specification Group Services and System Aspects; Single Radio Voice Call Continuity (SRVCC); Stage 2 (Release 8)", Jun. 9, 2008, XP002545302 Retrieved from the Internet; URL: http://www.3gpQ.org/ftg/S-Recs/html-infor/23216.htm [retrieved on Dec. 10, 2012].*

3GPP: "Technical Specification Group Services and System Aspects: Single Radio Voice Call Continuity (SRVCC): Stage 2 (Release 8)"; [Online]; pp. 15-16; XP002545302; Jun. 9, 2008.

Anand S. V. et al., "Unified Protocol Stack Architecture for 4G Mobile Terminals to Support Multiple Radio Access Technologies;" Wireless Telecommunications Symposium; 2007; WTS 2007; IEEE; Piscataway, NJ, USA; pp. 1-6; XP031285863; Apr. 26, 2007.

International Search Report for PCT/EP2009/001480 dated Feb. 3, 2010.

TD S2-083748, VoIP and other media handling in SRVCC, Nokia Siemens Network, Nokia, 3GPP TSG SA WG2 Meeting #65, Prague, Czech Republic, May 12-16, 2008, 11 pp.

* cited by examiner

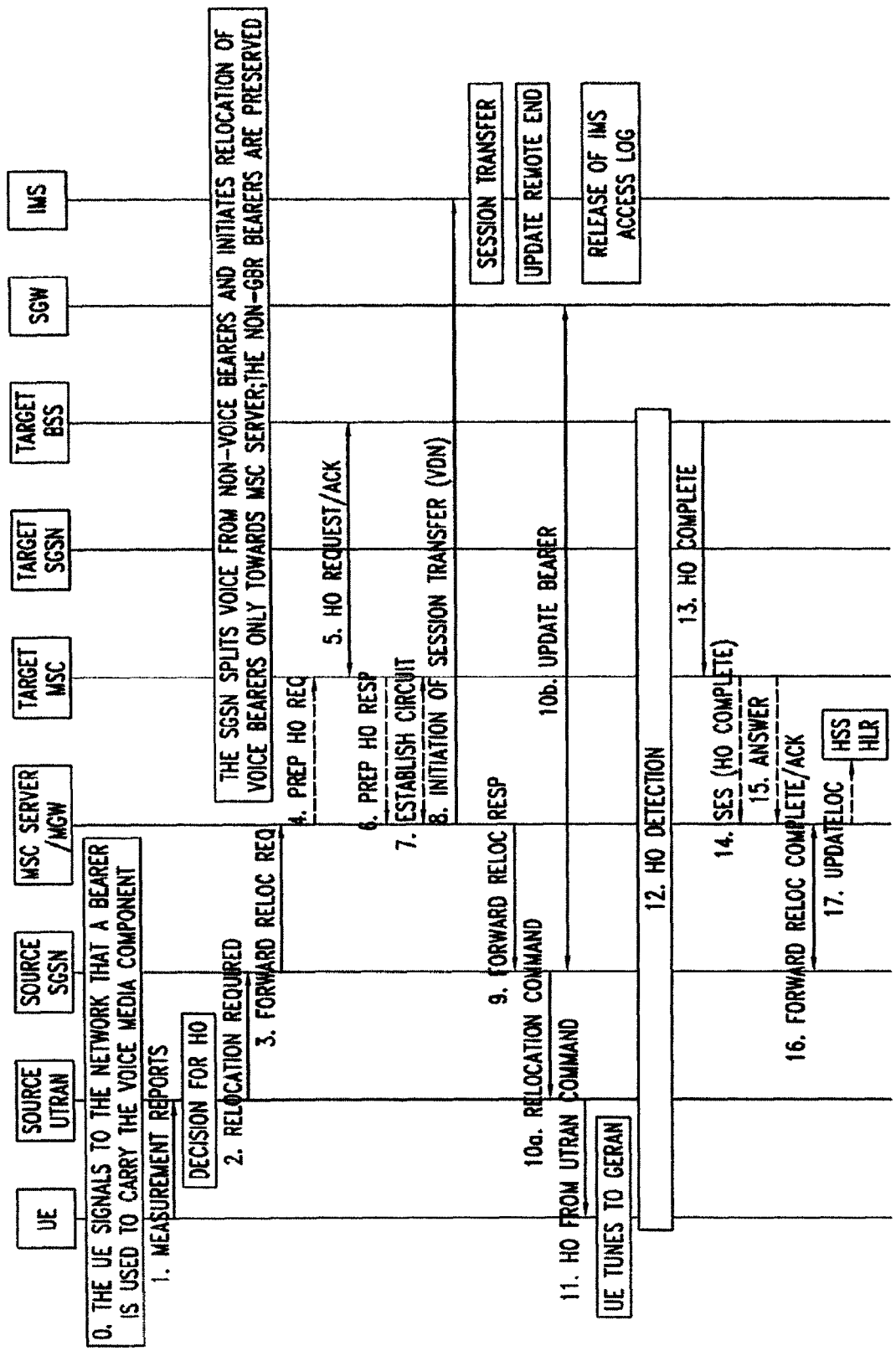

EXPLICIT INDICATION OF BEARERS SUBJECT TO VOICE CALL CONTINUITY

FIELD OF THE INVENTION

The present invention relates to telecommunications and, in particular, to a method, user equipment and a network entity.

BACKGROUND

With the introduction of voice over Internet protocol (VoIP) in cellular system, the issue of supporting acceptable voice quality arises (i.e. the need to guarantee no dropped calls as a user moves between the areas where VoIP is used and areas where the voice call continues using a traditional circuit-switched (CS) approach). Technical solutions are being developed in standards fora to address this problem. One particular technical issue is that the VoIP media component is carried on a specific cellular packet data bearer out of a plurality of potential packet data bearers. The network needs to know exactly which of these bearers is carrying this media component in order to enable the execution of the Voice Call continuity (VCC) procedures.

SUMMARY

Embodiments of this invention address this need and also the need to signal to the network whether this bearer carries only a voice Media component or also other media components (e.g. real time video), so that the network can continue to serve these other components after the Voice call is continued in the circuit-switched domain.

Other solutions proposed in the industry are based on the identification of the quality of service (QoS) of a specific bearer. If that bearer is of a real time class of service, it is assumed that this bearer is used to carry voice. However, while it is true that the QoS necessary to carry a VoIP media component is of real time nature, other media components may also be using the same QoS and as such this solution may lead to aliasing situations. Also, the case exists when multiple bearers may have the same real time QoS attributes, and only one or a subset of them is carrying Voice media.

Aspects of the present invention are set out in the accompanying claims, to which attention is invited.

The main concept proposed by embodiments of this invention is that in order to support a Voice call continuity procedure in a cellular system, it is the role of the user equipment (UE) to indicate to the network which packet bearer(s) carries (carry) the Voice media component(s) and also the should indicate whether there are other components beyond voice in that specific bearer. The UE is in fact aware of which bearers carry which media components. This enables the network to take a decision as to whether to remove the bearer(s) from the list of the packet-switched (PS) bearers that need to be handed over in the PS domain to the target system (if only the voice component was supported by the bearer, once the voice call is continued on the CS domain there is no longer need to keep these bearers) or whether to do something different (e.g. hand over the PS bearer with the other media components or invoke other services continuity mechanisms for these other media components).

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which:

FIG. 1 illustrates the main processing steps performed by entities of the network to support a voice call continuity procedure.

DESCRIPTION OF THE EMBODIMENTS

An example embodiment will now be described with reference to FIG. 1. The solution is described using as an example the continuity of a voice call between a High Speed Packet Access (HSPA) network and a Global System of Mobile Communications (GSM) network. The fundamental step in this procedure is step 0 where the entity (SGSN in the rest of the example) that will enforce the VCC procedure is notified which is the bearer that carries VoIP traffic. This notification may come from the UE (when the bearer carrying VoIP is activated/modified by the UE) using Non access stratum signalling. This could be as part of the packet data protocol (PDP) context activation procedure (when a dedicated bearer carrying VoIP is activated by the UE) or of a PDP context modification procedure (if the bearer to support VoIP is already active e.g. for other reasons than carrying VoIP, when the UE starts using it for VoIP). Alternatively, another method could be to use policy and charging control (PCC) mechanism to let the policy and charging rules function (PCRF) inform the serving general packet radio service serving node (SGSN) via the gateway general packet radio service serving node (GGSN) which bearers are used for voice.

Referring to FIG. 1:

0. The SGSN is notified of which bearer carries VoIP.
1. Based on UE measurement reports the source Universal Mobile Telecommunications System Terrestrial Radio Access Network (UTRAN) decides to trigger a handover to GSM Enhanced Data rates for GSM Evolution Radio Access Network (GERAN).
2. Source UTRAN sends Relocation Required (Source to Target Transparent Container) message to the source SGSN. UTRAN also indicates to SGSN that this is single radio voice call continuity (SRVCC) handover operation or a PS handover only.
3. Based on the indication provided at step 0, the source SGSN splits the voice bearer from the non-voice bearers and initiates the SR-VCC handover procedure for the voice bearer by sending a Forward Relocation Request (VCC Directory number (VDN), mobile station Integrated Services Digital Network number (MSISDN), Source to Target Transparent Container, mobility management (MM) Context) message to the mobile switching centre (MSC) Server. It is assumed that SGSN has previously received VDN and MSISDN from the home subscriber server (HSS) as part of the subscription profile downloaded during the UTRAN attach procedure. MM Context contains security related information. If the bearer has mixed voice and other media components, within a SR-VCC context the SRVCC handover (HO) indication shall point out that only the voice component of the packets carried on the bearer shall be subject to VCC, and the other components shall still be handled using mechanism outside the scope of this specification (e.g. Handover in the PS domain).

4. The MSC Server interworks the PS-CS handover request with a CS inter-MSC handover request by sending a Prepare Handover Request message to the target MSC. The CS Security key is derived from the UTRAN/PS domain key contained in the MM Context.
5. Target MSC performs resource allocation with the target base station subsystem (BSS) by exchanging Handover Request/Acknowledge messages.
6. Target MSC sends a Prepare Handover Response message to the MSC Server.
7. Establishment of circuit connection between the target MSC and the media gateway (MGW) associated with the MSC Server e.g. using ISDN Services User Part Initial Address Message (ISUP IAM) and Address Complete Message (ACM) messages.
8. The MSC Server initiates the Session Transfer by using the VDN e.g. by sending an ISUP IAM (VDN) message towards the Internet Protocol Multimedia Subsystem (IMS) Standard IMS Service Continuity procedures are applied for execution of the Session Transfer, see TS 23.292 and TS 23.237. During the execution of the Session Transfer procedure the remote end is updated with the Session Description Protocol (SDP) of the CS access leg. The downlink flow of VoIP packets is switched towards the CS access leg at this point.
    NOTE 2: If the MSC Server is using an ISUP interface, then the initiation of the session transfer may fail if the subscriber profile including Customised Applications for Mobile networks Enhanced Logic (CAMEL) triggers is not available prior handover (see clause 7.3.2.1 in TS 23.292)
9. MSC Server sends a Forward Relocation Response (Target to Source Transparent Container) message to the source SGSN.
10a. Source SGSN sends a Relocation Command (Target to Source Transparent Container) message to the source UTRAN. The message includes information about the voice component only.
10b. In parallel to the previous step the Source SGSN exchanges Update Bearer Request/Response [resp. Update PDP Context Request/Response] messages with the Serving GW [resp. GGSN]. The S1-U bearers [resp. PDP Contexts] are released for all evolved packet system (EPS) bearers [resp. PDP Contexts] and the voice bearer [resp. voice PDP Context] is deactivated. The non-guaranteed bit rate (GBR) bearers [resp. non-GBR PDP Contexts] are preserved. The SGSN is aware that a PS-CS handover has occurred, so upon receipt of downlink data notification from the S-GW [resp. upon receipt of packet data from the GGSN], the SGSN shall not page the UE.
11. Source UTRAN sends a Handover from UTRAN Command message to the UE.
12. Handover Detection at the target BSS.
13. Target BSS sends a Handover Complete message to the target MSC.
14. Target MSC sends an SES (Handover Complete) message to the MSC Server.
15. Completion of the establishment of the circuit connection between the MSC and the MGW associated with the MSC Server is completed e.g. with the target MSC sending ISUP Answer message to the MSC Server.
16. MSC Server sends a Forward Relocation Complete message to the source SGSN. informing it that the UE has arrived on the target side. Source SGSN acknowledges the information by sending a Forward Relocation Complete Acknowledge message to the MSC Server.
17. MSC Server may perform a mobile application part (MAP) Update Location to the home subscriber server/home location register (HSS/HLR) if needed. This may be needed for MSC Server to receive GSM supplementary service (SS) information and routing of mobile terminating calls properly in certain configuration.
    NOTE 3: this Update Location is not initiated by the UE.

ABBREVIATIONS

UE: User Equipment
PS—packet switched
CS—Circuit switched
GERAN—(GSM EDGE RAN)
RAN—Radio Access Network
UTRAN—UMTS terrestrial RAN
MSC Mobile Switching centre
SGSN Serving GPRS Serving node
HSS Home subscriber server
HLR home location register
BSS base station subsystem
PDP Packet data protocol
VDN VCC Directory Number
RRC Radio resource Control
RNC Radio network controller
MSISDN Mobile Station ISDN number
HSPA High speed packet access
ISDN Integrated serviced digital network
VCC Voice Call continuity (specified in 3G TS 23.206)
MAP mobile application part (specified in 3G TS 29.002)
SS Supplementary services
VoIP Voice over IP
MM Mobility Management
PCC Policy and Charging Control
PCRF Policy and Charging Rules Function A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGURE, including any functional blocks labeled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGURE are conceptual only.

Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method, comprising:
   determining, at a user equipment supporting a plurality of packet bearers
   available to the user equipment via a packet switched network, one or more packet bearers of said plurality of packet bearers carrying voice media components in conjunction with a voice call continuity procedure for a handover from the packet switched network to a circuit switched network to ensure voice call continuity; and
   sending a notification from said user equipment to an entity that will enforce said voice call continuity procedure using non-access stratum signalling, the notification indicating the one or more packet bearers determined to be carrying voice media components.

2. The method of claim 1, further comprising:
   determining, within user equipment supporting said plurality of packet bearers, which of said plurality of packet bearers carry other components, and
   notifying said entity which of said plurality of packet bearers carry said other components.

3. The method of claim 2, further comprising:
   maintaining a bearer when that bearer carries said other components to enable that bearer to be handed over to said circuit-switched network or to enable a continuity mechanism to be activated for those other components.

4. The method of claim 1, further comprising:
   no longer keeping a bearer when that bearer only carries said voice media components after handover to said circuit-switched network has occurred.

5. The method of claim 1, further comprising:
   notifying said entity as part of at least one of a packet data protocol context activation procedure and a packet data protocol context modification procedure.

6. The method of claim 1, wherein said entity comprises a serving general packet radio service serving node.

7. The method of claim 6, further comprising:
   in response to a measurement report received from said user equipment causing said handover to be triggered, sending a relocation required message to said serving general packet radio service serving node and indicating whether the handover is to be a single radio voice call continuity handover or a packet-switched handover.

8. The method of claim 7, further comprising:
   splitting, at said serving general packet radio service serving node, said packet bearers carrying said voice media components from said packet bearers carrying other components; and
   initiating said single radio voice call continuity handover for said packet bearers carrying said voice media components by sending a forward relocation request message to a mobile switching centre server.

9. The method of claim 8, further comprising:
   performing, in said target mobile switching centre, resource allocation with a target base station subsystem by exchanging request and handover messages.

10. The method of claim 8, further comprising:
    initiating, at said mobile switching centre server, a session transfer using a voice call continuity directory number to an IP multimedia subsystem;
    updating said IP multimedia subsystem with a session description protocol of a circuit-switched access leg; and
    switching voice media components towards said circuit-switched access leg.

11. The method of claim 8, further comprising:
    sending, from said mobile switching centre server, a forward relocation response message to said serving general packet radio service serving node.

12. The method of claim 7, further comprising:
    should it be determined that said packet bearers carry mixed voice media components and other components, initiating said single radio voice call continuity handover indicating that only said packet bearers carrying said voice media components shall be subject to voice call continuity.

13. The method of claim 6, further comprising:
    sending, from serving general packet radio service serving node to a source Universal Mobile Telecommunications System Terrestrial Radio Access Network, a relocation command containing information about said voice media components.

14. The method of claim 13, further comprising:
    in time relation to sending the relocation command, exchanging update bearer request and response messages between the serving general packet radio service serving node and a serving gateway.

15. The method of claim 1, further comprising:
    interworking a handover request with a circuit-switched inter-mobile switching centre handover request by sending a prepare handover request message to a target mobile switching centre.

16. The method of claim 15, further comprising:
    sending, from said target mobile switching centre, a prepare handover message to said mobile switching centre server.

17. The method of claim 15, further comprising:
    establishing circuit connection between said target mobile switching centre and a media gateway associated with said mobile switching centre server.

18. The method of claim 1, further comprising:
    releasing all evolved packet system bearers and deactivating a bearer carrying said voice media components.

19. The method of claim 1, further comprising:
preserving all non-guaranteed bit rate bearers.

20. The method of claim 1, further comprising:
completing handover of said user equipment to said target base station subsystem in the circuit-switched network.

21. User equipment, comprising:
a determination processor configured to determine one or more packet bearers of a plurality of packet bearers supported by the user equipment and
available to the user equipment via a packet switched network carrying voice media components in conjunction with a voice call continuity procedure for a handover from a the packet switched network to a circuit-switched network to ensure voice call continuity,
and a communication module configured to send a notification to an entity that will enforce said voice call continuity procedure using non-access stratum signalling, the notification indicating the one or more packet data bearers determined to be carrying voice media components.

22. A non-transitory computer-readable medium storing program instructions that, when executed by a computer, cause a corresponding computer-controlled content-centric networking message processing subsystem in a network device within a communication network to perform a method, the method comprising:
determining, at a user equipment supporting a plurality of packet bearers available to the user equipment via a packet-switched network, one or more packet bearers of said plurality of packet bearers carrying voice media components in conjunction with a voice call continuity procedure for a handover from the packet-switched network to a circuit-switched network to ensure voice call continuity; and
sending a notification from said user equipment to an entity that will enforce said voice call continuity procedure using non-access stratum signalling, the notification indicating the one or more packet bearers determined to be carrying voice media components.

* * * * *